Oct. 14, 1941.  M. R. HUTCHISON, JR  2,258,986
MULTIPLE COMPARTMENT LANTERN SLIDE HOLDER
Filed Nov. 26, 1940
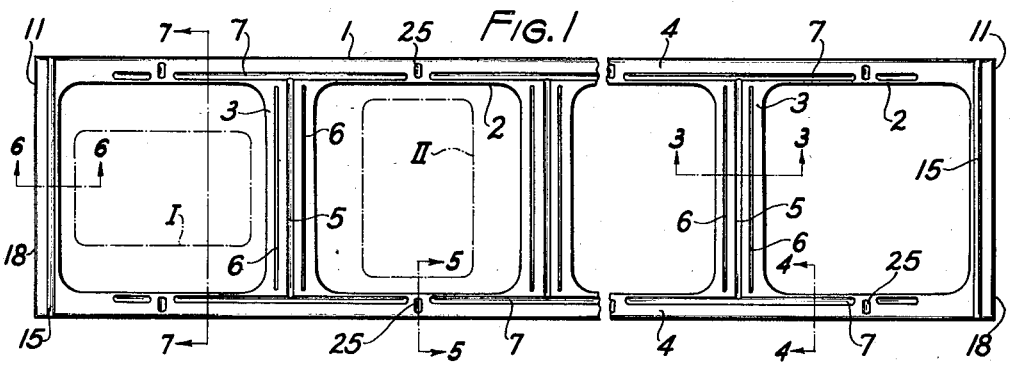
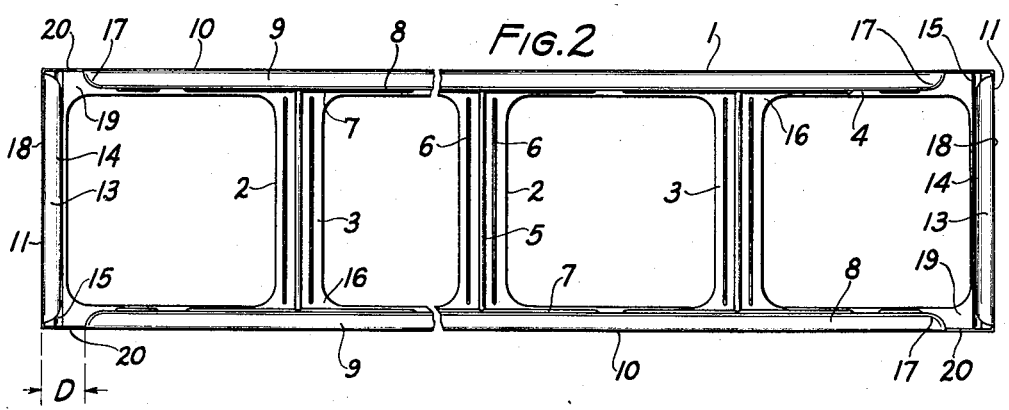
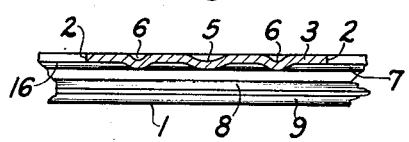
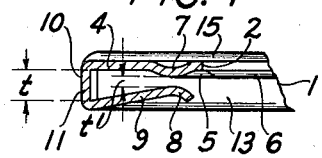
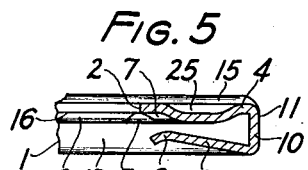
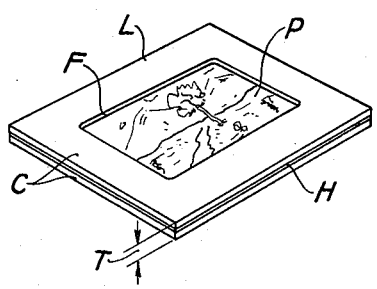
MILLER R. HUTCHISON JR.
INVENTOR
BY
ATTORNEYS Patented Oct. 14, 1941

2,258,986

UNITED STATES PATENT OFFICE 2,258,986

MULTIPLE COMPARTMENT LANTERN SLIDE HOLDER

Miller R. Hutchison, Jr., Rochester, N. Y., assignor to Eastman Kodak Company, Rochester, N. Y., a corporation of New Jersey Application November 26, 1940, Serial No. 367,204

3 Claims. (Cl. 88—26)

This invention relates to photography and more particularly to holders for lantern slides which may be used in magic lanterns.

One object of my invention is to provide a holder in which a plurality of lantern slides may be mounted in the proper relative position so that they may be passed through the magic lantern or projection machine one after the other by merely moving the slide carrier. Another object of my invention is to provide a slide carrier which is relatively inexpensive, which can be readily loaded and unloaded and which, while light in weight, is still sufficiently rugged to be repeatedly used.

Coming now to the drawing, wherein like reference characters denote like parts throughout:

Fig. 1 is a front plan view of a multiple compartment slide carrier constructed in accordance with and embodying a preferred form of my invention.

Fig. 2 is a rear plan view of the lantern slide carrier shown in Fig. 1.

Figs. 3, 4, 5 and 6 are all fragmentary detail sections on a much enlarged scale taken on the section lines 3—3, 4—4, 5—5 and 6—6 of Fig. 1.

Fig. 7 is an enlarged sectional view, part being broken away, on line 7—7 of Fig. 1.

Fig. 8 is a perspective view of a typical lantern slide adapted to be placed in my improved multiple compartment slide carrier.

There are at the present time many so-called miniature cameras on the market which produce small size exposures. These exposures may be made on the regular black and white film from which projection positives may be made or reversal film may be used so that the originally exposed film can be used for lantern slide projection work. A large portion of these small pictures are made on color film and there is a standard mount for these small size pictures of approximately 2 x 2 inches with an opening or frame of approximately 1 x 1½ inches. These dimensions are taken purely by way of illustration, because these small slide pictures may vary somewhat in outside dimension, but it is nevertheless customary to mount all of these small pictures in the 2" x 2" standard mounts.

My invention is particularly directed to a multiple compartment holder which will hold a plurality of such lantern slides, the holder to be used with the slides in place in projection and for storing the pictures. The holder must, therefore, be relatively inexpensive and it must be made of extremely light-weight material so that the holder itself will pass through a machine designed to take the 2" x 2" slides individually.

As a preferred embodiment of my invention I have shown a multiple compartment slide carrier of a size to take four standard 2" x 2" lantern slides. It is, of course, possible to alter the number of lantern slides that a holder will take without departing from my invention, but I find that such a holder is extremely convenient in use and for storing the slides when not in use.

Referring to Fig. 1, I prefer to make the lantern slide carrier of a single sheet of light-weight metal. This metal should be slightly springy and must be quite thin, because otherwise it would not pass through a machine designed to take the lantern slides alone.

Referring to Fig. 8, a typical lantern slide L is shown as being mounted between two sheets of cardboard C, the picture P being framed by the edges F of a frame cut to suitable dimensions. The cardboard frame C may be fastened together by a suitable adhesive H, so that the lantern slide L is in itself a unit which may be passed through a projector.

In accordance with my invention, I provide a holder which will take a plurality of the lantern slides L shown in Fig. 8. Such a holder, as indicated in Fig. 1, may consist of a frame plate I, preferably made of thin, slightly springy metal, which may be, for instance, .005" thick. This metal, because of its thinness, may bend quite easily, but is sufficiently springy to assume its normal position if slightly distorted. The frame plate I is provided with a series of apertures or openings 2 of slightly smaller dimensions than the outside dimensions of the slide L. Ribs 3 extend transversely between two longitudinal strips 4 to divide the frame plate into the series of apertures 2. Each of these ribs is provided with embossings. The central embossing 5, as indicated in Fig. 3, is somewhat wider than the two side embossings 6, these embossings all serving to strengthen the rib 3 and the embossing 5 tending to locate an edge of the lantern slide L being held in the frame.

The longitudinal edges 4 are provided with embossings 7 which may be continuous or which may be broken into lengths, as indicated in Fig. 1. These embossings, as shown in Fig. 7, provide rounded rails on which one side of a lantern slide L may rest and against which the lantern slide L may be pressed by a second set of parallel rails 8, these rails being formed in a flange 9 bent from a second flange 10, this flange in turn being bent from the material of the lantern slide holder 1.

Referring to Fig. 7, it will be noticed that the bend or fold 10 extends outwardly from the frame plate 1 and the fold 9 extends towards the opposite edge or fold in the metal of the base plate 1. Both longitudinal edges 4 have the same type forming, so that there will be two pairs of rails on which the lantern slides may slide into position—first, the rails formed by the embossings 7 on the metal base plate and second, the rails formed by the embossings or rounded edges 8 of the flanges 9.

Referring to Fig. 4, it will be noticed that in their position of rest and when no slides have been placed in the holder, the distance $t$, which is the inside length of the fold 10, is preferably slightly greater than the thickness T of the lantern slide L. It should also be noticed that the distance $t'$ is considerably less than the thickness T of the lantern slide L. Thus, when the slide is entered between the rails 8 and 7, the fold 9 springs outwardly due to the resiliency in the metal and tends to hold the lantern slide L in place between the two rails. At the same time, since the contact between the two rails and the slide is comparatively small, the slides can be freely slid into their proper positions beneath the apertures 2.

In order to reinforce the ends 11 of the frame to prevent these from bending too readily and in order to provide a type of latch which frictionally holds a series of lantern slides L in place, the extreme end walls 11 of the base plate 1 are folded outwardly at 12 and downwardly and inwardly at 13, as indicated in Fig. 6, the end of the wall 14 lying in an embossing 15, which is of sufficient depth to permit a slide to follow the inside wall 16 of the base plate 1 in being slid from the holder or to the holder. As this movement takes place, the edges of a slide L are slid under the rounded and upwardly flared ends 17 of the overhanging flanges 9.

From Fig. 2, it will be noted that these flanges are cut off a material distance D from the extreme end 18 of the holder so that there is a space into which the ends may be inserted. The frame has to flex during a loading or unloading operation, the reinforced end rails 11 springing downwardly due to the flexibility of the metal base plate across the areas 19 which are not reinforced by the flanges 9 but which are somewhat reinforced by the light metal flange 20 which extends upwardly from the base plate 1 and which corresponds somewhat to the outward fold 10 of the flanges 9. The flexibility of the base plate at 19 and the flexibility of the flanges 9 permit the slides to be moved to and from the carrier by springing the ends down and the flanges 9 up. The lantern slides L may then be moved on the parallel sets of rails 7 and 8 and slid until there is one lantern slide L directly behind each of the apertures 2. The large embossings 5 tend to retain the slide in position behind each frame and since the length of the frame is a multiple of the length of the lantern slide L, the frame can be filled with the slides. The end slides are held in position by means of a curved flange 13, as shown in Fig. 6, this flange resiliently engaging the edge of the lantern slide L.

As indicated in Fig. 6, the walls 12 and 13, together with the base plate 1, form a triangular reinforcing arm across the extreme ends of the base plate 1. These not only strengthen the slide carrier, but serve as snap latches or at least as a frictional latch for holding the lantern slides L in place.

It has been found that a holder loaded with four slides will securely hold these slides in place so that they cannot be accidentally shaken out. At the same time, a firm movement of the slide toward the open ends of the rails 9 will cause the slide to engage the curved wall 13 camming this edge rearwardly and a portion of the rails 8 upwardly so that the slides can be withdrawn or, by reversing this movement, inserted without any difficulty.

From Fig. 8 and Fig. 1, it will be noticed that I have provided a pair of transverse embossings 25 about the center of each aperture 2. The purpose of these embossings, which are of a rounded shape, is to frictionally engage a small portion of the lantern slides L, other than that portion engaged by the pairs of rails 7 and 8, so that these embossings also tend to hold the lantern slide L frictionally in the position to which they are moved. While this construction has been found useful, I have not found the transverse embossings 5 necessary and they may be omitted, if desired.

With the construction described above, four lantern slides may be mounted in the carrier. If the pictures are horizontal, the lantern slide frames may be turned in the direction of the frame I of Fig. 1. If, however, the pictures are vertical, the frames may be turned in the direction shown by II of Fig. 1. Since the pictures are reversed in projecting, the images should be upside down when the slide is inserted in the projector. The slide may be moved one step at a time to project one picture after another so that the holder may be manually pushed in and withdrawn from the usual type of projector.

If desired and if the projector is provided with a spring detent, the embossings 25 may also serve to center each picture in the projector, since it is a simple matter to slide the carrier until a spring latch can be felt to engage an embossing 25. These embossings are quite useful for projectors equipped with a spring detent, but if no such detent is employed in the projector, it is still a simple matter to manually adjust the slide until the picture fills the projection screen.

What I claim is:

1. A lantern slide carrier comprising a thin springy sheet metal frame of greater length than breadth, a plurality of apertures in the frame plate having cross bars therebetween, folds along the top and bottom of the frame plate outwardly and toward each other forming lantern slide mount receiving grooves, the edge of the folds being bent toward the frame plate and forming parallel springy rails on which a lantern slide mount may slide, rounded formings on the frame plate opposite the bent-over rails on which the lantern slide mounts may slide, said rails also stiffening the frame plate, formings extending across the width of the frame plate carried at the ends thereof, of a width substantially equal to the thickness of a lantern slide mount, and including a flange bent downwardly toward the frame plate, a rounded forming extending parallel to the ends of the frame plate into which the ends of the end formings are folded, and strengthening ribs formed in the cross bars between the apertures in the frame plate to oppose transverse flexing thereof.

2. A lantern slide carrier comprising a thin, springy metal frame of greater length than breadth, a plurality of apertures in the frame plate having cross bars therebetween, folds along the top and bottom of the frame plate outwardly and toward each other forming lantern slide mount receiving grooves, that portion of each fold which is toward the other fold being also formed toward the frame plate and rounded outwardly away from the frame plate to form spaced round rails adapted to engage and press a lantern slide mount against the frame plate, each fold along the top and bottom of the frame plate being resilient due to the springy material of which it is made, the ends of each fold along the top and bottom of the frame plate being cut off a short distance from the end of the frame plate and having a rounded and upwardly flared lip, a second pair of parallel rails positioned on the frame plate under the first-mentioned rail and including rounded embossings extending toward the first-mentioned rails, embossed rails being at least as short as the first-mentioned rails, flanges folded upwardly from and then downwardly toward the base plate at both ends thereof to strengthen the ends thereof and to provide tapered slideways to facilitate entering slides into and removing them from the slide carrier, the clearance between the upper and lower parallel rails and the ends of the frame plate and the resilience of the rails formed on the longitudinal folds of the metal plate also facilitating movement of the slides in the slide carrier in loading and unloading the carrier.

3. A lantern slide carrier for relatively rigid lantern slides comprising a thin, springy sheet metal plate having apertures therein, grooves along each longitudinal edge of the slide carrier comprising folds made in the metal plate, each fold being formed outwardly from the plate and inwardly toward each other, the last-named fold including a rounded rail formed toward the metal plate, embossings on the plate beneath the folds also forming rails, both sets of rails forming a slideway of less width than the thickness of a lantern slide, the rails all being of a length less than the length of the carrier and terminating at a point spaced from each end thereof, end formings on the slide carrier each consisting of an outward fold away from the metal plate and an inward fold against the base plate forming a reinforcement of triangular shape in cross section to strengthen the ends, whereby the metal plate and one set of rails are sufficiently resilient to pass a relatively rigid lantern slide into the grooves to slide on said pairs of rails in which position said triangular reinforced ends may frictionally hold said lantern slides in place.

MILLER R. HUTCHISON, Jr.